United States Patent [19]

Cowan et al.

[11] Patent Number: 5,309,999
[45] Date of Patent: May 10, 1994

[54] CEMENT SLURRY COMPOSITION AND METHOD TO CEMENT WELLBORE CASINGS IN SALT FORMATIONS

[75] Inventors: Kenneth M. Cowan, Sugar Land; Arthur H. Hale; James J. W. Nahm, both of Houston, all of Tex.

[73] Assignee: Shell Oil Company, Houston, Tex.

[21] Appl. No.: 964,992

[22] Filed: Oct. 22, 1992

[51] Int. Cl.$^5$ .................. E21B 33/13; E21B 33/138; C09K 7/00
[52] U.S. Cl. .................. 166/293; 166/292; 106/790; 175/65; 507/140
[58] Field of Search .................. 166/292, 293; 175/64, 175/65; 507/140; 106/789, 790

[56] References Cited

U.S. PATENT DOCUMENTS

| | | |
|---|---|---|
| 2,336,723 | 12/1943 | Drummond .................. 106/76 |
| 2,649,160 | 8/1953 | Williams et al. . |
| 2,822,873 | 2/1958 | Harmsen et al. .................. 166/29 |
| 2,880,096 | 3/1959 | Hurley . |
| 2,895,301 | 7/1959 | Casagrande et al. . |
| 2,899,329 | 8/1959 | Lyons .................. 106/287 |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall .................. 61/36 |
| 3,111,006 | 11/1963 | Caron .................. 61/36 |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. .................. 106/90 |
| 4,014,174 | 3/1977 | Mondshine .................. 61/53.52 |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. .................. 106/76 |
| 4,460,292 | 7/1984 | Durham et al. . |
| 4,518,508 | 5/1985 | Conner .................. 210/751 |
| 4,524,828 | 6/1985 | Sabins et al. .................. 166/293 |
| 4,643,617 | 2/1987 | Kanno et al. .................. 405/222 |
| 4,664,843 | 5/1987 | Burba, III et al. . |
| 4,668,128 | 5/1987 | Hartley et al. . |
| 4,674,574 | 6/1987 | Savoly et al. .................. 166/293 |
| 4,690,589 | 9/1987 | Owa .................. 405/263 |
| 4,692,065 | 9/1987 | Suzuki et al. .................. 405/211 |
| 4,720,214 | 1/1988 | Brasted et al. . |
| 4,746,245 | 5/1988 | Mork .................. 405/224 |
| 4,760,882 | 8/1988 | Novak . |
| 4,761,183 | 8/1988 | Clarke . |
| 4,790,954 | 12/1988 | Burba, III et al. . |
| 4,818,288 | 4/1989 | Aignesberger et al. .................. 106/789 X |
| 4,880,468 | 11/1989 | Bowlin et al. . |
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,020,598 | 6/1991 | Cowan et al. .................. 166/293 |

(List continued on next page.)

FOREIGN PATENT DOCUMENTS 144069 7/1983 Japan .
61-48454 3/1986 Japan .
833704 6/1981 U.S.S.R. .

*Primary Examiner*—George A. Suchfield

[57] ABSTRACT

A method to cement wellbores in salt formations is provided using a cement slurry composition comprising blast furnace slag, water and salt. The salt improves compressive strength of blast furnace slag based cements. This method is useful in cementing wellbores within salt and potash formations because salt saturated cement slurries can be prepared without the need for expensive additives.

17 Claims, No Drawings

U.S. PATENT DOCUMENTS

| | | |
|---|---|---|
| 5,026,215 | 6/1991 | Clarke . |
| 5,058,679 | 10/1991 | Hale et al. . |
| 5,082,499 | 1/1992 | Shen ................................. 106/735 |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. ............... 106/811 |
| 5,147,565 | 9/1992 | Bour et al. ...................... 252/8.551 |

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.

"Mud Disposal: An Industry Perspective", Hanson et al, Drilling, May 1986, pp. 16–21.

"Waste Minimization Program Can Reduce Drilling Costs", Hall et al, Oryx Energy Co., Houston, Tex., Oil & Gas Journal, Jul. 1, 1991, pp. 43–46.

"Phosphoric Acids and Phosphates", Kirk–Othmer Enc. of Chemical Technology, 3rd Ed., vol. 17, p. 477.

"Conversion of Drilling Fluids to Cements with Blast Furnace Slag–Performance Properties and Applications for Well Cementing", SPE Paper 24575 (Oct. 4, 1992) by Cowan et al.

"Quantitative Interpretation of X-Ray Diffraction Patterns of Mixtures.I.Matrix–Flushing Method for Quantitative Multicomponent Analysis" by Frank H. Chung, J. Appl. Cryst. (1974) 7, pp. 519–525.

CEMENT SLURRY COMPOSITION AND METHOD TO CEMENT WELLBORE CASINGS IN SALT FORMATIONS

FIELD OF THE INVENTION

This invention related to salt water cement slurries and, methods to cement wellbore casings in salt formations.

BACKGROUND OF THE INVENTION

For over 90 years, annuli between an oil well casing and the surrounding borehole have been cemented to prevent vertical communication of formation fluids inside the borehole. Particular difficulties occur in cementing wellbores when the wellbore penetrates salt or potash formations. Cement slurries that are not salt saturated will dissolve a portion of the formation as the cement slurry sets leaving voids and poor bonding between the cement and the salt formation. Salt saturated water is therefore used in the preparation of cement slurries for cementing within salt and potash formations. Salts generally retard setting of Portland type cements, and reduce the effectiveness of many common cement additives for Portland cement slurries. The set cements also do not have as high of a compressive strength of Portland cements prepared from fresh water. Additional setting accelerators and additives are therefore required that increase the cost of such cements. Such salt water Portland cement slurries are therefore relatively expensive. Such salt water Portland cement slurries can also be difficult to formulate due to interactions between the salt and the many cement additives required.

Cementing wellbores through saltdome formations is particularly difficult because the salt formation will slowly flow. The casing must therefore be particularly strong to resist movement of the salt formation. Strength of cement around the casing typically cannot be relied upon to resist movement of the salt formation due to typically poor bonding between the cement and the casing. If such bonding could be improved, the cement could add considerable strength to the casing.

It is an object of this invention to provide a method to cement a casing in a wellbore, the method utilizing an improved salt water cement slurry.

It is a further object of this invention to provide such a method wherein the cement slurry is prepared from drilling fluids.

It is yet a further object of this invention to provide a method for cementing a wellbore within a salt formation resulting in good bonding between the salt formation and the set cement.

In a preferred embodiment, it is an object of this invention to provide a method for cementing a casing in a wellbore in a salt formation slurry that will result in good bonding both between the salt formation and the cement and the cement and the casing.

SUMMARY OF THE INVENTION

These and other objects are accomplished by a method comprising the steps of providing a cement slurry composition, the cement slurry composition comprising blast furnace slag, water, and salt, placing the cement slurry composition within the wellbore juxtapose to the salt or potash formation, and allowing the cement slurry to set.

The use of salt in slag cement slurries can considerably increase the compressive strength of the resultant set cement. This is a particularly unexpected result in light of the detrimental effect of salt on the compressive strengths of Portland cements.

In a preferred embodiment of the present invention, the wellbore is drilled using a blast furnace slag containing salt-saturated drilling fluid, and this drilling fluid is converted into a settable cement slurry by addition of activators and/or additional blast furnace slag. This reduces disposal costs for used drilling fluids, eliminates the need for supplying additives for the cement slurry that are present in the drilling fluid, and most significantly, results in a settable filter cake being laid down on the wall of the wellbore. The settable filter cake significantly improves bonding between the set cement and the formation.

Bonding between the cement and the casing is preferably improved by inclusion of a surfactant in the cement slurry. Blast furnace slag based cements bond to casing particularly well due to the absence of shrinking upon curing and to compatibility with drilling fluids remaining on the casing surface. But the addition of surfactants improves this bonding Such bonding is particularly important in cementing casing into wellbores penetrating salt or potash formations or salt domes. The salt or potash will slowly creep. This creep can result in significant forces being placed on a casing. The effect of the creep on the casing is considerably reduced by good bonding between the casing and the set cement.

Strength and ductility of blast furnace slag based cements is also considerably improved by inclusion of crosslinkable polymers in the cement slurry. Acid functionalized polymers that can be crosslinked by complexing with metal ions are therefore preferably included in the cement slurry composition of the present invention. The ductility imparted by these polymers is particularly useful when a casing is cemented into a salt or potash formation due to the slow creep movement around the wellbore.

DETAILED DESCRIPTION OF THE INVENTION

Blast Furnace Slag

Blast furnace slag is the hydraulic refuse from the melting of metals or reduction of ores in a furnace as disclosed in Hale and Cowan, U.S. 5,058,679 (Oct. 22, 1991), the disclosure of which is hereby incorporated by reference.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a surface area between 500 $cm^2$/gm and 15,000 $cm^2$/gm and more preferably, between 3,000 $cm^2$/gm and 15,000 $cm^2$/gm, even more preferably, between 4,000 $cm^2$/gm and 9,000 $cm^2$/gm, most preferably between 4,000 $cm^2$/gm and 9,000 $cm^2$/gm all as Blaine specific surface areas. An available blast furnace slag which fulfills these requirements is marketed under the trade name "NEW-CEM" by the Blue Circle Cement Company. This slag is obtained from the Bethlehem Steel Corporation blast furnace at Sparrows Point, Maryland.

A usual blast furnace slag composition range in weight percent is: $SiO_2$, 30–40; $Al_2O_3$, 8–18; CaO, 35–50; MgO, 0–15; FeO, 0–1; S, 0–2 and manganese oxides, 0–2. A typical specific example is: $SiO_2$, 36.4; $Al_2O_3$, 16.0; CaO, 43.3; MgO, 3.5; FeO, 0.3; S, 0.5; and manganese oxides <0.1.

Blast furnace slag having relatively small particle size is frequently desirable because of the greater strength imparted by such blast furnace slags in many instances to a final cement. Characterized in terms of particle size the term "fine" can be used to describe particles in the range of 4,000 to 7,000 $cm^2/gm$ Blaine specific surface area. Corresponding to 16 to 31 microns in size; "microfine" can be used to describe those particles in the 7,000 to 10,000 $cm^2/gm$ Blaine specific surface area range that corresponds to particles of 5.5–16 microns in size and "ultrafine" can be used to describe particles over 10,000 $cm^2/gm$ Blaine specific surface area that correspond to particles 5.5 microns and smaller in size.

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, and even the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25wt% would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4wt% of the slag, would need to be ground to the ultrafine particle size. Generally, 5 to 20wt%, more preferably 5 to 8wt% can be ground to the ultrafine particle size and the remainder ground in a normal way thus giving particles generally in a size range of greater than 11 microns, the majority being in the 11 to 31 micron range.

Blast furnace slags vary in susceptibility to salt increasing compressive strength of the set cements. Blast furnace slag having about a 10,040 $cm^2/gm$ Blaine specific surface area available from Koch Minerals of Wichita, Kansas, under the tradename "WELL-CEM", and "NEWCEM" blast furnace slag available from Blue Circle Cement Company of Sparrows Point, Maryland, having about a 5,500 $cm^2/gm$ Blaine specific surface area demonstrate significant improvement in strength when slurried in salt containing water. "MICROFINE MC-100", a blast furnace slag available from Geochem having about 10,990 $cm^2/gm$ Blaine specific surface area does not demonstrate an increase in strength when blended with salt water, but is not detrimentally affected by blending with salt saturated water. Most blast furnace slags do demonstrate improved compressive strengths when blended with salt waters, and the effect of salt water on the available blast furnace slags can be readily determined through routine experimentation. It is preferred that the blast furnace slag of the present invention be a blast furnace slag susceptible to increasing compressive strength when hydrated in salt water as opposed to fresh water. A slag having a twenty percent or more increase in compressive strength when hydrated in sodium chloride saturated water is preferred.

The total amount of cementitious material (i.e., blast furnace slag plus metal compounds for crosslinking acid functionalized polymers) in the cementitious slurry will typically range from about 20 lbs/bbl to about 600 lbs/bbl, preferably 100 lbs/bbl to 500 lbs/bbl, most preferably 150 lbs/bbl to 350 lbs/bbl. This can be adjusted to give the desired density as noted hereinabove.

Salts

The water used to prepare the cement slurries preferably contains enough salt to result in 5 percent by weight or more of salt in the resultant slurry. The water is more preferably salt saturated. The preferred salt is sodium chloride, but any of the salt discussed herein as being useful in the drilling fluid of this invention are acceptable. Sea water is acceptable for preparing the slurries of this invention.

Acid Functionalized Polymers

In a preferred embodiment, of the present invention, the salt water cement slurry includes an acid functionalized polymer and a crosslinker. Such polymers crosslink through complexes with the acid functionality with crosslinkers such as metal ions from metal oxides to form solid ionomeric systems. The blast furnace slag of the present invention may also function as the crosslinker. Suitable polymer components of such ionomers can be represented by the formula

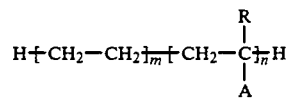

wherein A is selected from the group consisting of:

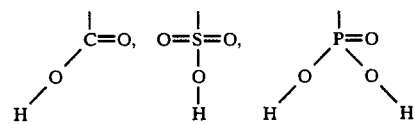

and a mixture of

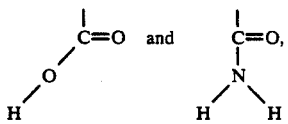

and wherein R is H or a 1–10 carbon atom alkyl radical. The ratio of m to n is generally within the range of 0:1 to 100:1, preferably 0:1 to 10:1. The acid and the hydrocarbon segments of the polymer can be mixed randomly, or in an alternating fashion.

The polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One of the more preferred polymers is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000–5,000,000 molecular weight are suitable. The copolymers will generally have from 2–99, preferably 5–80, more preferably 10–60 mole percent acid-containing units.

The ionomers suitable for use in this invention are the water-insoluble reaction product of a proton acceptor metal compound which serves as the cementitious component and a polymer acid component. The metal compound generally is a metal oxide such as CaO, MgO, ZnO or MnO. The preferred metal oxides are magnesium oxide and zinc oxide, and most preferably, magnesium oxide. The applicable metal oxides are generally fired at temperatures above 1000° F. for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity of at least 3.0, preferably 3.5. By 'insoluble' is meant that less than 0.01 parts by weight dissolve in 100 parts by weight of cold (room temperature) water.

The poly(carboxylic acid) component can be any water soluble or water dispersable carboxylic acid polymer which will form ionomers. Ionomer forming polymers are well known in the art. Suitable polymers include poly(acrylic acid), poly(methacrylic acid), poly(ethacrylic acid), poly(fumaric acid), poly(maleic acid), poly(itaconic acid) and copolymers such as ethylene/acrylic acid copolymer and ethylene/methacrylic acid copolymer. The copolymers are generally random copolymers.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature to the static temperature of the surrounding formations.

The amount of acid functionalized polymer utilized will vary widely depending upon the carboxylic acid content of the polymer; broadly, 10 to 200, preferably 10 to 100, most preferably 10 to 80 wt%, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred.

When the acid functionalized polymers are combined with a polyvalent metal compound, a crosslinked network structure exists as a result of the addition of the second component, thus giving a very strong solid cement. The formation of the cement can be retarded by providing the polymer with ester functionality in place of some or all of the acid functionality. The esters hydrolyze slowly, producing acid functionality in situ.

The particle size of the metal compound component can vary widely. Generally, it will be within the range such that the powder exhibits a surface area within the range of 500 cm$^2$/g to 30,000 cm$^2$/g, preferably 1,500 cm$^2$/g to 25,000 cm$^2$/g, most preferably 2,000 cm$^2$/g to 20,000 cm$^2$/g all as Blaine specific surface areas.

Preferably, when the acid functionalized polymer is utilized, the metal compound is added first and thereafter at such time as it is desired for the cement to be activated to set, the acid functionalized polymer is added. When universal fluids are utilized, a portion of the total metal compound can be added to the drilling fluid, the remainder being added after dilution when the cementitious slurry is being formed.

In all embodiments of the invention, additional cement can be made and used, in accordance with this invention, for remedial cementing.

The ionomer embodiments of this invention are of particular value for filling and sealing the annulus between a borehole wall and a casing where some degree of ductility and/or tensile strength is desired. The ionomer has good adhesive properties to the borehole wall and casing and has greater elasticity than is obtained with siliceous hydraulic materials such as Portland cement. Thus, such cements are resistant to cracking under conditions of cyclic loading as are frequently encountered in a wellbore. This ductility is particularly important in cementing through salt strata because of the tendency for salt to exist in a deformable plastic state, and slowly flow inward into the borehole.

Another area where the ductility of the ionomer cement is of special value is in slimhole wells where the annulus is smaller. Still yet another area where this ductility is important is in extended reach drilling. The term ,extended reach, is intended to cover horizontal drilling and any other well drilling operations which are off-vertical a sufficient amount to cause the casing to be displaced by gravity toward one side of the borehole.

Mixed Metal Hydroxides

Mixed metal hydroxides are preferably used in the drilling fluid to impart thixotropic properties. The mixed metal hydroxides provide excellent solids suspension. This, in combination with the settable filter cake provided in the technique of this invention, greatly enhances the cementing in a restricted annulus. The mixed metal hydroxides are particularly effective in muds containing clay such as sodium bentonite. Preferred systems thickened in this way contain from 1-20 lbs/bbl of clay such as bentonite, preferably 7 to 12 lbs/bbl, most preferably 0.1 to 2 lbs/bbl. The mixed metal hydroxides are generally present in an amount within the range of 0.1 to 2 lbs/bbl of total drilling fluid, most preferably 0.7 to 1.2 lbs/bbl. Mixed metal hydroxides are known in the art and are trivalent metal hydroxide-containing compositions such as $MgAl(OH)_{4.7};Cl_{0.3}$. They conform essentially to the formula $$Li_m D_d T(OH)_{(m+2d+3+na)} A'^n_a$$

where m represents the number of Li ions present; the said amount being in the range of zero to about 1;

D represents divalent metals ions; with d representing the amount of D ions in the range of zero to about 4;

T represents trivalent metal ions;

A' represents monovalent or polyvalent anions of valence $-n$, other than $OH^-$, with a being the amount of A' anions; and where $(m+2d+3+na)$ is equal to or greater than 3. A more detailed description can be found in Burba, U.S. 4,664,843 (May 12, 1987). The mixed metal hydroxides in the drilling fluid, in combination with blast furnace slag, tend to set to a cement having considerable strength in a comparatively short time, i.e., about one-half hour at temperatures as low as 100° F. This can be a major asset in some applications. In such instances, a thinner such as a lignosulfate is preferably added before adding slag. The activator or activators can be added either with any other ingredients that are added before the additional blast furnace slag, with the additional blast furnace slag, or after the addition of the additional blast furnace slag.

In some instances, it may be desirable to use a material which functions as a retarder along with the activator because of the need for other effects brought about by the retarder. For instance, a chromium lignosulfonate may be used as a thinner along with the activator even though it also functions as a retarder to setting of blast furnace slag cements.

Other suitable thinners include chrome-free lignosulfonate, lignite, sulfonated lignite, sulfonated styrene maleicanhydride, sulfomethylated humic acid, naphthalene sulfonate, a blend of polyacrylate and polymethacrylate, an acrylamideacrylic acid copolymer, a phenol sulfonate, dodecylbenzene sulfonate, and mixtures thereof.

The amount of blast furnace slag present in the universal fluid is generally within the range of 1 to 100 lbs/bbl of final drilling fluid, preferably 10 to 80 lbs/bbl, most preferably 20 to 50 lbs/bbl. When ionomers are utilized, the amount of metal compound initially present in universal fluid can also vary widely. Generally, 1 to 500 lbs/bbl, preferably 50 to 300 lbs/bbl, most preferably 100 to 250 lbs/bbl of the metal compound are used.

Drilling Fluids

The cement slurry of the present invention is preferably prepared from drilling fluid that has been used to drill the wellbore. The initial drilling fluid or mud can be either a conventional drilling fluid, i.e., one not containing a blast furnace slag, or it can be one already containing a blast furnace slag in a relatively small amount. The drilling fluid can be either a water-based fluid or an oil-based fluid, but preferably, any aqueous phase present is salt saturated. The term 'water-based fluid' is intended to encompass both fresh water muds, salt water containing muds, whether made from seawater or brine, and other muds having water as the continuous phase including oil-in-water emulsions. It is generally preferred that the water-based drilling fluids use water containing dissolved salts, particularly sodium chloride, in order to minimize enlargement of the wellbore in the salt formation. The use of saturated salt solutions for the preparation of the cement slurry additionally increases the compressive strength of the set cement. About 20 to 27 wt% sodium chloride is preferably used. One suitable source is to use seawater or a brine solution, although sodium chloride would be added. This is contrary to what would be expected in view of the intolerance of Portland cement to brine. Various salts, preferably organic salts, are suitable for use in the drilling fluid used in this invention in addition to, or instead of sodium chloride, including, but not limited to, $NaBr$, $KBr$, $KCl$, $CaCl_2$, $MgCl_2$, $NaNO_3$, $KNO_3$, $NaC_2H_3O_2$, $KC_2H_4O_2$, $NaCHO_2$ and $KCHO_2$. The term 'oil-based fluids' as used herein includes fluids having oil as the continuous phase, including low water content oil-base mud and invert oil-emulsion mud.

The term 'universal fluid' is used herein to designate those compositions containing cementitious material, which compositions are suitable for use as a drilling fluid, and which compositions thereafter, for the purpose of practicing this invention, have additional cementitious material and/or activators such as accelerators (or reactive second components) added to give a cementitious slurry.

An embodiment of this invention utilizing universal fluid is accomplished by preparing a universal fluid by mixing a salt saturated drilling fluid or drilling mud and blast furnace slag; drilling a borehole with the universal fluid thereby laying down a settable filter cake on the walls of the borehole during drilling of the well; adding additional blast furnace slag and/or accelerators (or reactive second components) and introducing the thus-formed salt saturated cementitious slurry through the casing, and out the bottom of the casing into an annulus between the wellbore and a casing where it hardens forming a good bond with the filter cake. The filter cake, with time, actually hardens itself because of the presence of cementitious material therein. This hardening is facilitated by any accelerators which may be present in the cementitious slurry and which migrate by diffusion and/or filtration into the filter cake.

In accordance with the invention that utilizes universal fluid, the fluid itself becomes a part of the final cement and thus, this portion of the drilling fluid does not need to be disposed when drilling is completed.

Drilling Fluid Additives

Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

Universal Fluids

In another embodiment of this invention, most or all of the components of the drilling fluid are chosen such that they have a function in the cementitious material also. The following Table illustrates the uniqueness of such formulations.

The material in the above Table A labeled PECP is of special significance in connection with this invention. This refers to a polyhydric alcohol most preferably a polycyclicpolyetherpolyol. A general chemical composition formula representative of one class of these materials is as follows:

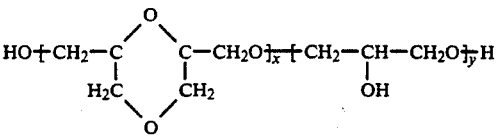

where $x \geq 1$ and $y \geq 0$.

A more complete description of these polycyclicpolyetherpolyols is found in the Hale and Cowan patent, U.S. Pat, No. 5,058,679 (Oct. 22, 1991), referred to hereinabove, the disclosure of which is incorporated herein by reference.

Blast Furnace Slag Activators

Suitable activators include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium

TABLE A

| | Function | | | |
|---|---|---|---|---|
| | Drilling Fluid | | Cementitious Solid | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Biopolymer[3] | Viscosity | | Viscosity | Retarder |
| Silicate | Viscosity | Shale stabilizer | Accelerator | — |
| Carbohydrate polymer[4] | Deflocculant | — | Retarder | Deflocculant |
| Barite[5] | Density | — | Density concentration | Solids |
| Bentonite[6] | Fluid loss control | — | Fluid loss control | Solids concentr. |
| Clay/Quartz dust[7] | — | — | Solids concentration | — |
| Metal Component[8] | Cuttings stabilizer | — | Cement component | Solids |
| Functional Group Polymer | Not Present | Not Present | Cement component | — |
| Lime | Cuttings and wellbore stabilizer | Alkalinity | Accelerator concentration | Solids |
| PECP[9] | Shale stabilizer | Fluid loss | Retarder | Rheological control |
| NaCl | Shale stabilizer | — | — | — |

[1]Polydrill, A synthetic polymer manufactured by SKW Chemicals Inc. under trade name Polydrill, for instance.
[2]Starch made by Milpark Inc. under the trade name "PERMALOSE", for instance.
[3]A biopolymer made by Kelco Oil Field Group, Inc., under the trade name "BIOZAN" for instance.
[4]Water-soluble carbohydrate polymer manufactured by Grain Processing Co. under trade name "MOR-REX".
[5]Barite is BaSO$_4$, a drilling fluid weighting agent.
[6]Bentonite is clay or colloidal clay thickening agent.
[7]Clay/quartz solid dust manufactured by MilWhite Corp. under the trade name "REVDUST", for instance.
[8]Blast furnace slag manufactured by Blue Circle Atlantic Co. under the trade name "NEWCEM" is suitable.
[9]Polycyclicpolyetherpolyol sulfate, calcium nitrate, calcium nitrite, calcium hydroxide, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to "lbs/bbl" means pounds per barrel of final cementitious slurry.

A combination of sodium hydroxide and sodium carbonate is preferred. In addition, blast furnace slag can be added between the use of this material as a drilling fluid and its use as a cement. The additional slag can be the activator, especially if heat is imparted to the operation. Each component is an important ingredient for both the drilling fluid and the cement. The PECP is particularly significant in combination with slag since it acts as a retarder and thus provides significant drilling fluid functions in general and specific drilling functions relative to the slag component as well as significant cement functions. PECP also reduces the friction coefficient of muds on casing and filter cake, and pullout forces required to release stuck pipe are dramatically reduced with PECP in the drilling fluid.

The unique advantage of universal fluids is that wellbore stabilization, fluid-loss control, and cuttings transport can be realized essentially the same as with conventional drilling fluid systems. However, with the simple presence of activators in the subsequent cementitious slurry, the resulting mud-slag system will develop strength. Thus, for instance, (1) drilling fluid filter cake deposited while drilling over permeable zones can be converted into an effective sealant by diffusion of activators from the mud-slag column; and (2), whole mud that has not been removed from washed-out sections of the hole during displacement will harden with time and, therefore, provide an effective sealant and lateral support to the casing.

In areas such as slim hole drilling, the ionomer universal fluid gives the process benefit of avoiding the removal of an incompatible drilling mud and the product benefit of being resistant to deflection when set.

In the case of the universal fluids, the amount of cementitious material can vary considerably and also can vary depending upon whether the cementitious component is a siliceous material, an organometal, or a polyphosphate.

Drilling Process

Process and apparatus used to drill and cement casings within wellbores are well known. A typical practice is as follows. A well is drilled using a hollow drill string having a drill bit with at least one orifice communicating between the inside of the hollow drill string and the outside and located at the lower end of the drill string, thus producing a wellbore. During this drilling, a drilling fluid is circulated down the inside of the drill string and out of the orifice at the lower end thereof. The drilling fluid cools and lubricates the bit and transports cuttings up the wellbore in the annulus surrounding the drill string. When the drilling is complete, the drill string is withdrawn from the wellbore. A first section of well casing, generally having a float shoe with an upper sealing surface, is inserted into the wellbore. Additional sections of casing are generally attached sequentially to the first section and the first section is inserted further into the wellbore. In accordance with one embodiment of this invention, additional drilling fluid, containing additives necessary to form a cementitious slurry, is pumped down the casing. This may be facilitated by inserting a bottom plug into the casing string, the bottom plug having a longitudinal passage and a rupturable diaphragm at the top, so that it is forced down the casing by the cementitious slurry. Thereafter, a top or second plug can be inserted into the casing string above the column of cementitious slurry, the diaphragm of the first plug ruptured, and the slurry forced up into an annulus between the outside of the casing and the inside of the borehole where, with time, it hardens.

In one embodiment the drilling fluid consists essentially of blast furnace slag, salt and water, as above, and is pumped exclusively using the piping and pumps associated with the drilling rig without the need for any pumps designed for pumping cement. This is possible with the blast furnace slag based cements due to the improved control of setting.

In a preferred embodiment of the present invention, the cement slurry is placed in the wellbore prior to inserting the casing into the wellbore. Placing the cement slurry into the wellbore prior to inserting the casing eliminates difficulty in displacing drilling fluids with cement slurry in portions of the borehole where the casing is poorly centralized. When the casing is poorly centralized, it is difficult to get the cement slurry in the narrow portion of the annulus. This results in a vertical channel that allows communication up the wellbore after the cement sets by placing the cement slurry into the wellbore prior to inserting the casing, these vertical channels will therefore be avoided even if the casing is poorly centralized. The use of blast furnace slag based cement slurry facilitates the use of this procedure because setting of the blast furnace slag based cement slurries can be retarded so that the casing can be inserted into the slurry and yet still form a strong cement within a reasonable time.

In yet another related embodiment of this invention, universal fluid is utilized in a drilling operation and thereafter additional cementitious material and/or additives, is gradually added so as to gradually transition the circulating material from a drilling fluid to a cement slurry.

Whether the drilling fluid is gradually converted into a cement slurry or converted into a cement slurry by a single addition of blast furnace slag, additional salt containing water may be added to the drilling fluid. The specific gravity of the drilling fluid is usually controlled within narrow limits to prevent fracturing of the formations and also keep gas from entering the wellbore from the formation. Because addition of blast furnace slag will increase the specific gravity of the fluid, additional water may be added to maintain the specific gravity of the final cement slurry within acceptable limits.

In yet another embodiment of this invention the drilling process is carried as described hereinabove with a universal fluid to produce a borehole through a plurality of strata thus laying down a filter cake. Prior to the cementing operation an activator is passed into contact with the filter cake, for instance by circulating the activator down the drill string and up the annulus between the drill string and the filter cake, or else the drill string is removed and the casing inserted and the activator circulated down the casing and up the annulus. As used herein 'down' as it relates to a drill string or casing, means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out or other unstable zones. After the drilling is complete the drilling fluid is then diluted, the drill string removed, and the cementing carried out as described hereinabove. This can be accomplished by circulating a separate fluid containing the activator or by adding an activator such as an alkali as described hereinabove to the drilling fluid.

Conventional spacers may be used in the above described sequence. Also, any left over fluid having activators therein may be displaced out of the borehole by the next fluid and/or a spacer fluid and stored for subsequent use or disposal.

Bonding Surfactants

Surfactants, alcohols, or blends thereof may be used in the cement slurry of this invention to improve bonding to the casing. The surfactants may be anionic, cationic, nonionic, amphoteric, or blends thereof, e.g., non-ionics with anionic or cationic surfactants.

The following surfactants, classes of surfactants, and mixtures of surfactants are particularly useful in the present invention:

Alkanol amides (nonionic);
Ethoxylated alkyl aryl sulfonate;
Amine oxides (nonionic);
Ethoxylated Alcohols (nonionic);
Sulfates and Sulfonates of Ethoxylated Alcohols (anionic);
Ethoxylated Alkyl Phenols (nonionic);
Sulfates or Sulfonates of Ethoxylated Alkyl Phenols (and their salts) (anionic);
Fluorocarbon-based Surfactants (nonionic, amphoteric, anionic);
Phosphate Derivatives of Ethoxylated Alcohols;
Quaternary Ammonium Chloride (cationic);
Sulfates or Sulfonates of Alcohols (and their salts)(Anionic); and
Condensation Products of Ethylene Oxide and Propylene Glycol (nonionic).

The surfactants or mixtures of surfactants should be soluble in the cement slurry and not precipitate or otherwise degrade under the action of the ions in the cement slurry (e.g., resistant to calcium and other electrolytes) and the temperature and pressure conditions occurring during the placement and curing of the cement.

Especially preferred are nonylphenol ethoxylates, cocoamido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}$–$C_{15}$ linear alcohol ethoxylate sulfate, $C_9$–$C_{11}$ linear alcohol ethoxylate sulfates, sodium lauryl sulfate, and ethoxy alcohol sulfates.

The concentration of surfactant in the water phase used to prepare the slurry will generally be from about 0.1 to about 5% by weight, and more preferably from about 0.2 to about 3% by weight; excellent results have been obtained with concentrations between about 1.17 and about 2.33% by volume.

Alcohols

Polyhydric alcohols may be included in the drilling fluids of the present invention. The following alcohols may be used alone or in blends with the preceding surfactants. The polyalcohol ingredients of drilling fluids containing polyalcohols are preferably acyclic polyols having at least two carbon atoms and 2 hydroxyl groups but no more than 18 carbon atoms and 13 hydroxyl groups. Preferably, the polyols of the invention have at least 2 carbon atoms and 2 hydroxyl groups, but no more than 9 carbon atoms and 7 hydroxyl groups.

The alcohols or mixtures of alcohols of this invention should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in the drilling fluid (e.g., resistant to calcium and electrolytes) and the temperature and pressure conditions occurring during drilling. The alcohols may also be soluble at the ambient temperature and pressure conditions on the surface during the preparation of the drilling fluid of this invention.

The concentration of alcohol in the water phase used to prepare the drilling fluid of this invention will generally be at least about 2% by weight and preferably from about 2 to about 30% by weight based on the water phase and more preferable from about 5 to about 15% by weight; excellent results have been obtained with concentrations between about 10 and about 20% by weight. Preferably at least about 1% w of the alcohol is cyclicetherpolyol or acyclic polyol, based on the total weight of the alcohol.

EXAMPLE 1

Cement slurries were prepared using salt saturated muds as starting materials, and fresh water muds as comparisons. Table 1 includes formulations and set times and compressive strengths for these slurries and cements from these slurries.

In Table 1, Colton slag was a commercially available blast furnace slag from the Colton Plant (available from California Portland Cement Co.). The crushed compressive strength was determined from cured samples crushed on a Versa Tester (hydraulic press). Field Mud A was a 9.9 lb/gal salt saturated mud from a well in N. Hobbs, New Mexico. Field Mud A contained about two percent by weight drilled solids. The mud had a yield point of 8 lb/100 ft$^2$, a plastic viscosity of 7 cp, and an API fluid loss of 14. Spud Mud was a simulated spud mud containing 30 pounds per barrel of RevDust to simulate drilling solids and 0.5 pounds per barrel of lime. The Spud Mud samples were not salt saturated.

Field Mud B is a 10.45 pound per gallon salt-saturated mud. The slurries containing 225 pounds per barrel of blast furnace slag in Field Mud B had a density of about 13 pounds per gallon. Desco CF is a polyphenolic tannin mud thinner available from Drilling Specialty Company.

EXAMPLE 2

Field Mud B was combined with 10 lb/bbl of caustic soda bead, 10 lb/bbl of soda ash, and 2 lb/bbl of Desco CF to create about 320 bbl of 13.06 lb/bbl slurry. This slurry was then used to cement a 5.5 inch diameter casing over a 4,395 foot long interval of a 26° directional well. The dry components were blended offsite, and mixed with the mud on-site on the fly at a rate of 10 barrels per minute using a Halliburton RCM cement unit. A tail cement of 15 lb/gal Class H conventional tail cement was pumped through the casing and into the annulus following the blast furnace slag cement. About 135 bbl of blast furnace slag cement slurry was circulated to the surface, leaving about 185 bbl in the annulus.

Examples 1 and 2 demonstrate that salt saturated muds can be used to prepare salt-saturated cement slurries using blast furnace slag as a hydraulic component, and that the resultant set cements are as effective as blast furnace slag cements prepared from fresh water.

EXAMPLE 3

The improvement imparted by use of saturated salt water in a blast furnace slag cement slurry was determined by preparing six blast furnace slag cement slurries, three with fresh water and three with a brine from a west Texas brine well. One fresh water and one brine slurry was prepared from each of three types of blast furnace slag. Each slurry contained 500 grams of blast furnace slag and 350 ml of liquid (water or brine). The slurries each developed compressive strengths of 500 psi or greater within 15 hours. Cements from the saturated salt slurries ultimately had more than 50 percent greater compressive strengths than the corresponding cements from fresh water slurries. Table 2 summarizes the components and resulting compressive strengths from the slurries.

TABLE 2

| Sample | Slag | Water | Compressive Strength - psi | Time for Comp. Strength - hrs |
|---|---|---|---|---|
| 1 | "NEWCEM[1]" | Fresh | 566 | 23 |
| 2 | "NEWCEM" | Salt | 977 | 23 |
| 3 | KOCH[2] | Fresh | 965 | 23 |
| 4 | KOCH | Salt | 1453 | 23 |
| 5 | "MC100[3]" | Fresh | 1392 | 120 |
| 6 | "MC100" | Salt | 1392 | 120 |

[1]"NEWCEM" is a blast furnace slag available from Blue Circle Cement Company that has about a 5,500 $cm^2$/gm Blaine specific surface area.
[2]"WELLCEM" a 10,040 $cm^2$/gm Blaine specific surface area slag available from Koch Minerals of Wichita, Kansas.
[3]"MICROFINE MC100" is a fine grain blast furnace slag having a 10,990 $cm^2$/gm Blaine surface area available from Geochemical Corporation.

This example demonstrates the unexpected improvement in set cement compressive strengths resulting from the inclusion of salt in the blast furnace slag slurry.

In these examples, the pounds per barrel refer to barrels of initial mud, not finished slurry.

While this invention has been described in detail for the purpose of illustration, it is not to be construed as limited thereby, but is intended to cover all the changes and modifications within the spirit and the scope thereof.

TABLE 1

| Slurry No. | Base Mud Type | Additives (lb/bbl) Colton Slag | NaOH | Na$_2$CO$_3$ | Dispersant Additive Name | Concentr. (lb/bbl) | UCA UCATest Temp. (°F.) | UCA Set Time 50 psi (hr:min) | UCA Set Time 500 psi (hr:min) | Compressive Strength (psi) | UCA Aging at Days | Crushed Compressive Strength (psi) |
|---|---|---|---|---|---|---|---|---|---|---|---|---|
| 1 | Lab | 225 | 14 | — | QBII | 3 | 106 | 2:09 | 13:03 | 881 | 6 | 680 |
| 2 | Lab | 225 | 10 | 4 | QBII | 2 | 106 | 4:46 | 20:34 | 701 | 6 | 840 |
| 3 | Lab | 225 | 14 | — | QBII | 4 | 106 | 5:50 | 18:12 | 777 | 6 | 780 |
| 4 | Lab | 225 | — | 14 | QBII | 2 | 106 | 12:12 | 25:12 | 967 | 6 | 1,100 |
| 5 | Lab | 225 | 14 | — | Miltemp | 4 | 106 | 1:52 | 29:13 | 766 | 6 | 630 |
| 6 | Spud* | 300 | — | 6 | QBII | 4 | RT | 7:55 | 23:24 | 671 | 6 | 1,030 |
| 10 | Spud | 225 | 14 | — | — | — | RT | 3:55 | — | 359 | 3 | 440 |
| 11 | Spud | 225 | 14 | — | QBII | 2 | RT | 12:44 | — | 458 | 4 | 670 |
| 12 | Spud | 225 | — | 14 | — | — | RT | 25:14 | 84:57 | 614 | 7 | 1,390 |
| 13 | Spud | 225 | 14 | — | QBII | 0.5 | RT | 5:22 | — | 305 | 2 | 470 |
| 14 | Spud | 225 | 10 | 4 | — | — | RT | 2:31 | — | 437 | 3 | 610 |
| 15 | Spud | 225 | 10 | 4 | QBII | 0.5 | RT | 3:11 | — | 488 | 6 | 688 |
| 16 | Spud | 225 | 4 | 14 | — | — | RT | 9:47 | 29:41 | 937 | 6.7 | 1,520 |
| 17 | Spud | 225 | — | 18 | — | — | RT | 44:40 | 76:47 | 834 | 6.6 | 1,680 |
| 18 | Spud | 300 | 7.5 | 15 | — | — | RT | 3:50 | 16:57 | 1,137 | 6.7 | 1,350 |
| 19 | Spud | 300 | 11.25 | 11.25 | QBII | 2 | RT | 3:31 | 12:03 | 1,123 | 6.7 | 1,800 |
| 20 | Spud | 275 | 6.9 | 13.8 | QBII | 2 | RT | 7:21 | 21:27 | 1,018 | 3.6 | 1,640 |
| 21 | Spud | 250 | 6.3 | 12.5 | QBII | 2 | RT | 10:39 | — | 793 | 3.6 | 1,240 |
| 22 | Field A | 225 | 3 | 14 | — | — | 106 | 5:11 | 13:04 | 977 | 4.5 | 910 |
| 23 | Field A | 225 | 3 | 14 | Impermex | 3 | 106 | 8:54 | 20:52 | 751 | 4 | 740 |
| 24 | Field A | 225 | 3 | 14 | Atta/Imp | 20/3 | 70 | 46:21 | — | 333 | 4 | 1,430 |
| 25 | Field A | 225 | 3 | 14 | Atta/Imp | 20/3 | 96 | 7:53 | 16:43 | 1,068 | 4 | 1,270 |
| 26 | Field A | 225 | 3 | 14 | — | — | 106 | 6:10 | 12:57 | 967 | 4 | 1,050 |
| 27 | Field A | 225 | 3 | 14 | — | — | 106 | 3:58 | 10:24 | 863 | 4 | 960 |
| 28 | Field A | 225 | 6 | 14 | — | — | 70 | 19:58 | 55:37 | 586 | 2.7 | 1,300 |
| 29 | Field A | 225 | 3 | 17 | — | — | 70 | 43:09 | — | 315 | 4 | 1,620 |
| 30 | Field A | 225 | 6 | 16 | — | — | 70 | 33:53 | — | 491 | 4 | 1,570 |
| 31 | Field B | 225 | 10 | 14 | — | — | 68 | 21:33 | — | 1,250 | 16 | 1,450 |
| 32 | Field | 225 | 10 | 12 | — | — | 68 | 16:32 | — | 1,086 | 16 | 1,550 |

TABLE 1-continued

| Slurry No. | Base Mud Type | Additives (lb/bbl) Colton Slag | NaOH | Na₂CO₃ | Dispersant Additive Name | Concentr. (lb/bbl) | UCA UCATest Temp. (°F.) | UCA Set Time 50 psi (hr:min) | UCA Set Time 500 psi (hr:min) | Compressive Strength (psi) | UCA Aging at Days | Crushed Compressive Strength (psi) |
|---|---|---|---|---|---|---|---|---|---|---|---|---|
| 33 | Field B | 225 | 10 | 10 | — | — | 68 | 15:28 | — | 1,094 | 16 | 1,360 |
| 34 | Field B | 225 | 10 | 8 | — | — | 68 | 18:20 | — | 1,187 | 16 | 1,630 |
| 35 | Field B | 225 | 10 | 8 | Desco CF | 0.25 | 90 | 9:03 | — | 403 | 1 | — |
| 36 | Field B | 225 | 10 | 10 | Desco CF | 0.25 | 90 | 4:15 | — | 338 | 1 | — |

Notes:
Lab Mud: 0.87 bbl water + 110 lb/bbl salt + 12 lb/bbl attapulgite + 1 lb/bbl Impermex + 1 lb/bbl lime + 30 lb/bbl "REV DUST"
Spud Mud: 1 bbl water + 12 lb/bbl gel + 30 lb/bbl "REV DUST" + 0.5 lb/bbl lime
Field A Mud: 9.9 lb/gal salt-saturated mud
Field B Mud: 10.45 lb/gal salt-saturated mud
*Spud mud without lime
Atta/Imp = Attapulgite/Impermex

We claim:

1. A method to cement a cashing into a wellbore within a salt or potash formation comprising the steps of:
   a) providing a cement slurry comprising blast furnace slag, water and salt in an amount effective to essentially saturate the slurry with the salt and further comprising a polymer containing acid functional groups and a crosslinker which is a metal oxide;
   b) placing the cement slurry in the wellbore juxtaposed to the salt or potash formation; and
   c) allowing the cement slurry to set.

2. The method of claim 1 wherein the amount of salt is effective to essentially saturate the slurry.

3. The method of claim 1 wherein the blast furnace slag has a surface area between 2000 cm²/gm and 15,000 cm²/gm.

4. The method of claim 1 wherein the particle size distribution of the blast furnace slag exhibits at least two nodes on a plot of particle size vs. percent of particles of that size.

5. The method of claim 1 wherein the polymer is of the formula:

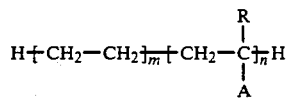

wherein A is selected from the group consisting of:

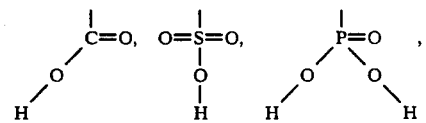

and a mixture of

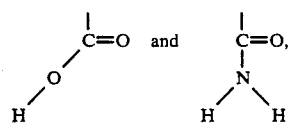

and wherein R is H or a 1-10 carbon atom alkyl radical.

6. The method of claim 5 wherein the ratio of m to n is within the range of 0:1 to 100:1.

7. The method of claim 1 wherein the amount of salt in the slurry is about five percent by weight of the slurry or more.

8. A method to cement a casing into a wellbore within a salt or potash formation comprising the steps of:
   a) drilling the wellbore using a salt saturated drilling fluid;
   b) adding to a portion of the drilling fluid blast furnace slag in an amount effective to form a settable cement slurry and thereby forming a settable cement slurry;
   c) placing the cement slurry in the wellbore juxtapose to the salt or potash formation; and
   d) allowing the cement slurry to set.

9. The method of claim 8 wherein the blast furnace slag is essentially the only hydraulic material in the cement slurry.

10. The method of claim 9 wherein the amount of salt is effective to essentially saturate the slurry.

11. The method of claim 9 further comprising a polymer containing acid functional groups and a crosslinker.

12. The method of claim 11 wherein the crosslinker is a metal oxide.

13. The method of claim 9 wherein the blast furnace slag has a surface area between 2000 cm²/gm and 15,000 cm²/gm.

14. The method of claim 9 wherein the particle size distribution of the blast furnace slag exhibits at least two nodes on a plot of particle size vs. percent of particles of that size.

15. The method of claim 11 wherein the polymer is of the formula:

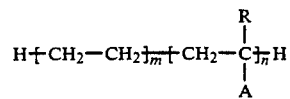

wherein A is selected from the group consisting of:

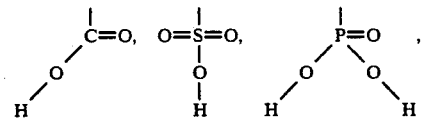
and a mixture of
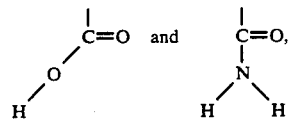
and wherein R is H or a 1-10 carbon atom alkyl radical.
16. The method of claim 15 wherein the ratio of m to n is within the range of 0:1 to 100:1.
17. The method of claim 8 wherein the amount of salt in the slurry is about five percent by weight of the slurry or more.
* * * * *